(12) United States Patent
Steiner et al.

(10) Patent No.: US 9,331,805 B2
(45) Date of Patent: May 3, 2016

(54) NETWORK AND METHOD FOR IMPLEMENTING A HIGH-AVAILABILITY GRAND MASTER CLOCK

(75) Inventors: Wilfried Steiner, Vienna (AT); Günther Bauer, Vienna (AT); Martin Schwarz, Wiener Neustadt (AT)

(73) Assignee: FTS Computertechnik GmbH, Vienna (AT)

( * ) Notice: Subject to any disclaimer, the term of this patent is extended or adjusted under 35 U.S.C. 154(b) by 115 days.

(21) Appl. No.: 14/115,314

(22) PCT Filed: May 2, 2012

(86) PCT No.: PCT/AT2012/050058
§ 371 (c)(1),
(2), (4) Date: Jan. 13, 2014

(87) PCT Pub. No.: WO2012/151598
PCT Pub. Date: Nov. 15, 2012

(65) Prior Publication Data
US 2014/0185632 A1  Jul. 3, 2014

(30) Foreign Application Priority Data

May 6, 2011  (AT) .................................. A 641/2011

(51) Int. Cl.
*H04J 3/06* (2006.01)
(52) U.S. Cl.
CPC ............. *H04J 3/0658* (2013.01); *H04J 3/0641* (2013.01)
(58) Field of Classification Search
CPC ............................. H04J 3/0658; H04J 3/0641

USPC .......................................... 370/356, 503, 498
See application file for complete search history.

(56) References Cited

U.S. PATENT DOCUMENTS

| | | | | |
|---|---|---|---|---|
| 8,503,484 B2* | 8/2013 | Bonk et al. | ..................... | 370/503 |
| 8,576,883 B2* | 11/2013 | Lansdowne | ..................... | 370/503 |
| 2009/0207863 A1* | 8/2009 | Cheng et al. | ..................... | 370/498 |
| 2011/0002429 A1* | 1/2011 | Williams et al. | ..................... | 375/356 |

(Continued)

OTHER PUBLICATIONS

Stefan Kowalewski & Marco Roveri, "Formal Methods for Industrial Critical Syestems", Sep. 2010, Springer, pp. 1-230.*

(Continued)

*Primary Examiner* — Kwang B Yao
*Assistant Examiner* — Syed M Bokhari
(74) *Attorney, Agent, or Firm* — KPPB LLP

(57) ABSTRACT

In a network based on IEEE 1588, comprising a plurality of nodes (201, 501) and a plurality of connections where each connection connects at least two nodes to allow communication between nodes including the exchange of messages according to a network protocol, the synchronization of IEEE 1588 is improved by allowing multiple grandmaster clocks (701) to operate simultaneously in the system. Thus, the re-election protocol of IEEE 1588 is made obsolete. For this, a multitude of nodes form a subsystem implementing a high-availability grand master clock (301) according to the IEEE 1588 Standard, wherein the subsystem is configured to tolerate the failure of at least one of said nodes forming said subsystem. Bi-directional communication link (401) are configured for physically connecting a IEEE 1588 Master clocks (201) and/or IEEE 1588 Slave clocks (201) to the subsystem implementing a high-availability grand master clock (301).

14 Claims, 2 Drawing Sheets

(56) References Cited

U.S. PATENT DOCUMENTS

2011/0135047 A1* 6/2011 Tournier ............ G05B 19/0421
  375/356
2012/0106576 A1* 5/2012 Hadzic .......................... 370/503

OTHER PUBLICATIONS

International Search Report for Application No. PCT/AT2012/050058, International Filing Date May 2, 2012, Search Completed Sep. 5, 2012, Mailed Dec. 9, 2012, 3 pages.

Astrit et al., "Time-Triggered Ethernet and IEEE 1588 Clock Synchronization", 2007 International IEEE Symposium on Prevision Clock Synchronization (ISPCS) for Measurement, Control and Communication, Vienna, Austria, Oct. 1-3, 2007, pp. 41-43.

Kozakai, Yasuyuki et al., "Keeping Clock Accuracy on a Master Clock Failure in Substation Network", Precision Clock Synchronization for Measurement Control and Communication (ISPCS), 2010 International IEEE Symposium, IEEE, Piscataway, NJ, USA, Sep. 27, 2010, 5 pgs.

* cited by examiner

NETWORK AND METHOD FOR IMPLEMENTING A HIGH-AVAILABILITY GRAND MASTER CLOCK

FIELD OF THE INVENTION AND DESCRIPTION OF PRIOR ART

The present invention relates to a method and system in the technological area of computer engineering, more in detail, to a method for synchronizing the local clocks in nodes of a computer system in which the nodes are connected by means of a network. More specifically, the invention proposes a grand master clock, in particular a high-availability grand master clock, for the IEEE 1588 Standard (IEEE Standard for a Precision Clock Synchronization Protocol for Networked Measurement and Control Systems), preferably with regard to the current version IEEE 1588-2008 as well as any compatible future versions. The invention improves the synchronization method as defined in IEEE 1588 by allowing multiple grand master clocks to operate simultaneously in the system; thus, it renders the re-election protocol of IEEE 1588 obsolete. For this, the invention provides a method to implement a high-availability grand master and furthermore provides a (sub)system implementing said method. In one realization of the invention a TTEthernet network may be used to implement the high-availability grand master for IEEE 1588.

The invention serves to improve the performance of computer systems that consist of a network of spatially distributed computing nodes (called nodes for short) that execute command applications and/or control applications such as a computer system in a chemical plant that controls the pressure in a vessel. Such a computer system may monitor the actual pressure in the vessel using appropriate sensors, compare the read sensor value to a predefined upper bound, and operate an actuator, e.g., a heater, to bring the actual pressure in close agreement to the predefined upper bound. Such computer systems are often generally referred to as real-time systems, because their functions need not only produce the correct output—as it is sufficient in regular office computer systems—but need to produce this output also within defined and often very tight temporal bounds.

The nodes of a real-time system are typically equipped with local clocks capable of measuring the progress of real-time. It is engineering practice that the computer system implements a method to synchronize these local clocks in the spatially distributed nodes to each other, such that at any point in real-time any two correctly functioning clocks in any two nodes of the real-time system have very similar values. The maximum difference of the values of two local clocks of correctly functioning nodes is called the precision; in other words, the precision is defined as the maximum distance between any two synchronized non-faulty clocks in the network at any point in real time. "Non-faulty" means that a device is operating according to its specification, and "synchronized" means that a device successfully started up (e.g. after power-on or reset). The IEEE 1588 standard defines such a method to synchronize the local clocks. In particular, the method described in IEEE 1588 is based on selecting exactly one synchronization master, called the grand master clock, to which all other nodes in the computer system synchronize to. In case of the failure of the grand master clock, IEEE 1588 specifies a re-election protocol, called PTP, which selects a new grand master clock in case that there is an appropriate node present in the computer system. In some applications the re-election protocol is not acceptable because it potentially leads to a degradation of the precision in the system and/or it cannot be guaranteed that all nodes in the computer system consistently select the same new grand master clock.

In the context of the invention any expression of the form 'IEEE 1588 device' is understood as relating to a 'device', such as a network node, Master clock, Slave clock, etc., which is compatible with the IEEE 1588 standard. Likewise any expression of the form 'IEEE 1588 message' is understood as a 'message' (such as a Sync message, Announce message, etc.) formed in accordance with the IEEE 1588 standard. The terms 'masters' and 'slaves' are used here in the meaning as defined in the IEEE 1588 standard: In short, an IEEE 1588 Master is "a master clock in the context of a single Precision Time Protocol (PTP) communication path, a clock that is the source of time to which all other clocks on that path synchronize" (IEEE 1588-2008, p. 5); and an IEEE 1588 Slave is a slave clock that synchronizes to another clock (i.e., a master clock) in the network. IEEE 1588 Masters and IEEE 1588 Slaves form a synchronization hierarchy with the IEEE 1588 grand master clock as the ultimate source of time. A node in the network may, thus, be both IEEE 1588 Master and IEEE 1588 Slave at the same time, e.g., when it directly synchronizes to the grand master clock (exhibiting the role of the IEEE 1588 Slave) and communicates with another node which synchronizes to it (thus serving as an IEEE 1588 Master).

Within this disclosure, the nodes are also referred to as end systems. Furthermore the network connecting the end systems consists of physical connections and switches, where two end systems are connected to each other via at least one switch, and physical connections connect the end systems to switches as well as switches to switches. End systems have local clocks. Switches may have local clocks. Such local clocks are physical components, like oscillators. Hence, the local clocks will not perfectly represent real-time, but may be faster or slower than real-time. The difference of rate between a local clock and a theoretical perfect clock is commonly referred to as a clock's drift rate. Typical values for drift rates of clocks used in the area of command and control applications are in the area of about some tens or few hundreds of ppm. The drift rate causes the values of the local clocks of different end systems and/or switches to diverge with progress in real-time. Hence, the local clocks have to be periodically re-aligned to each other such that their maximum distance will not exceed a predefined bound, called the precision. This re-alignment process is called the synchronization of clocks.

In order to synchronize the local clocks of end systems and/or switches to each other, the end systems and/or switches exchange information in form of synchronization messages with each other. The types of synchronization messages and the rules of how these synchronization messages have to be exchanged are commonly referred to as the synchronization protocol. IEEE 1588 defines such a synchronization protocol.

Of particular interest to the invention are the following types of synchronization messages of the IEEE 1588 standard: IEEE 1588 Announce messages and the IEEE 1588 Sync messages. IEEE Announce messages are used by the IEEE 1588 synchronization protocol to determine the exactly one grand master out of the set of end systems and/or switches in the network. The grand master continually sends IEEE 1588 Sync messages in the network. End systems and/or switches that receive IEEE 1588 Sync messages and implement the IEEE 1588 standard use the IEEE 1588 Sync messages to synchronize their local clock to the local clock of the grand master.

The IEEE 1588 Announce messages are used in the PTP protocol, a part of the IEEE 1588 synchronization protocol. Each end system and switch that participates in the PTP protocol periodically sends an IEEE 1588 Announce message to all end systems and switches in the network. Each end system and switch that participates in the PTP protocol selects the best of these IEEE 1588 Announce messages and uses its respective sender as grand master for synchronization. The determination of the best IEEE 1588 Announce message is done locally at the receivers by comparing the IEEE 1588 Announce messages of the different senders with each other. It is guaranteed by the PTP protocol that there exists exactly one best IEEE 1588 Announce message in the set of received IEEE Announce messages.

From a fault-tolerance perspective the IEEE 1588 standard defines a synchronization protocol that implements so called sequential redundancy. This means that, in case of the failure of the current grand master, the PTP protocol of the IEEE 1588 standard re-elects a new grand master. Sequential redundancy in general and the specific method defined in IEEE 1588 have two main drawbacks. Firstly, the re-election process does not happen instantaneously, but takes a certain duration in real-time. This means that during this time of re-election no grand master is present to which the IEEE 1588 Masters and IEEE 1588 Slaves can synchronize their local clocks to. Consequently, their local clocks will drift from each other. Therefore, the precision (i.e., the maximum difference of any two non-faulty local clocks) needs to take these, potentially long, periods of non-synchronization into account. As a result of this non-synchronization the precision may become unacceptable large for certain applications. The second significant drawback of the IEEE 1588 sequential redundancy approach to synchronization is the lack of ensuring consistency and grand master availability in certain critical failure scenarios. This means that in certain scenarios, such as when a grand master fails in a malicious failure mode, IEEE 1588 cannot ensure that the IEEE 1588 Masters and 1588 Slaves will ever elect a new grand master and/or will consistently select the same grand master.

An example of such a failure mode of a grand master that will cause the system to continually re-elect a grand master is a grand master that fails intermittently. This means that the faulty grand master may only send IEEE 1588 Announce messages for short periods, while failing to send IEEE 1588 Sync messages. Each time the faulty grand master sends IEEE 1588 Announce messages it will be elected as the new grand master. When it fails to send IEEE 1588 Sync and Announce messages, just after election, a new grand master will be elected. However, just after the election of the new grand master the faulty grand master may again send its IEEE 1588 Announce messages, therefore causing another re-election process. This sequence of operational/non-operational faulty behavior of the faulty grand master causes, thus, the system to continually re-elect grand masters. Another example failure that will lead to an inconsistent grand master election is a faulty switch that relays the IEEE 1588 Sync and Announce messages of a current grand master only to a subset of IEEE 1588 Masters and IEEE 1588 Slaves. Therefore, lacking the messages from the current grand master, the remaining IEEE 1588 Masters and Slaves will re-elect another (i.e., second) grand master.

SUMMARY OF THE INVENTION

In view of the above, it is an object of the invention to provide a method and implementation which will overcome the mentioned deficiencies. The invention provides a method and implementation as described in the independent claims. The dependent claims describes further advantageous developments of the invention.

In particular, according to a first aspect of the invention based on a network comprising a plurality of nodes and a plurality of connections where each connection connects at least two nodes to allow communication between nodes including the exchange of messages according to a network protocol, the network according to the invention comprises
a) a multitude of nodes forming a subsystem implementing a high-availability grand master clock according to the IEEE 1588 Standard, wherein the subsystem is configured to tolerate the failure of at least one of said nodes forming said subsystem, and
b) at least one bi-directional communication link, each link configured for physically connecting a IEEE 1588 Master clocks and/or IEEE 1588 Slave clocks to the subsystem implementing a high-availability grand master clock.

This solution is based on the concept of a high-availability grand master (abbreviated as HAGM) that uses parallel redundancy instead of, or in addition to, sequential redundancy. While in IEEE 1588 at any given time there is at most one node acting as grand master, the invention provides a method and implementation in which a grand master—the HAGM—is constructed out of a multitude of nodes. This solution improves the synchronization method as defined in IEEE 1588 by allowing multiple grandmaster clocks to operate simultaneously in the system and, thus, making the re-election protocol of IEEE 1588 obsolete. It further enables a fault-tolerant realization of a grand master clock, which offers increased reliability and improved properties during startup and operation of the network. That means that in the case of a failure of one of the grandmaster clocks no change-over to another grandmaster clock needs to be done, but there already exists at least one other grandmaster clock that provides IEEE 1588 Sync messages and ensures that the local clocks in the network are synchronized. Such an always-operational time service is a prerequisite for many critical applications that must operated seamlessly and without interruption.

In another aspect, the invention also provides a method for implementing a network according to the invention, which method includes the following steps:
a) providing a multitude of nodes forming a subsystem implementing a high-availability grand master clock according to the IEEE 1588 Standard, and configuring the subsystem to tolerate the failure of at least one of said nodes forming said subsystem, and
b) establishing at least one bi-directional communication link, each link configured for physically connecting a IEEE 1588 Master clocks and/or IEEE 1588 Slave clocks to the subsystem implementing a high-availability grand master clock.

Further aspects of the invention relate to a TTEthernet switch and/or a network node which are configured to participate in a subsystem implementing a high-availability grand master clock according to the invention.

In a further development of the invention, the HAGM according to the invention is configured to generate and send IEEE 1588 Announce messages to IEEE 1588 Masters and/or IEEE 1588 Slaves in a way that its IEEE 1588 Announce messages are always selected as the best IEEE 1588 Announce messages. The Announce messages of this type will ensure that the high-availability grand master clock will be selected as the best master by the IEEE 1588 best master clock algorithm. In one implementation this can be done by configuring the IEEE 1588 Announce messages of the HAGM as the best possible Announce messages according to the IEEE 1588 standard.

The IEEE 1588 Master and IEEE 1588 Slave clocks use the IEEE 1588 Sync messages from the grand master to synchronize their local clocks to. Note, that as all IEEE 1588 Master and IEEE 1588 Slave local clocks are synchronized to the grand master, the local clocks are also synchronized to each other.

In another development of the invention, the network can be connected to at least two redundant standard IEEE 1588 grand master clocks, and the high-availability grand master clock is configured to generate IEEE 1588 Sync messages as a response to receiving IEEE 1588 Sync messages emitted from the redundant standard IEEE 1588 grand master clocks, whereby a) the high-availability grand master clock consumes the IEEE 1588 Sync messages and IEEE 1588 Announce messages form the redundant standard IEEE 1588 grand master clocks and does not forward these IEEE 1588 Sync messages, and b) the timing information represented by the IEEE 1588 Sync messages generated by the high-availability grand master clock represents the mean, median, fault-tolerant mean, or fault-tolerant median value of the timing information of the said IEEE 1588 Sync messages received from standard IEEE 1588 grand master clocks (101) or an offset to this value.

In particular in the context of the two previous developments, the high-availability grand master clock may be configured to not send or forward any IEEE 1588 Sync messages or IEEE 1588 Announce messages to the redundant standard IEEE 1588 grand master clocks. This serves to avoid possible conflicts between the various grand master clocks.

In one realization of the invention, some of the nodes of this multitude of nodes act as IEEE 1588 grand master at the same time. This means that even in the case of the failure of one or more of the nodes acting as IEEE 1588 grand master, the HAGM is still able to maintain the synchronized time, i.e., send IEEE 1588 Sync messages, as long as there are correctly operating nodes left in the multitude of nodes that form the HAGM.

According to a further aspect of the invention, which is capable of maintaining the synchronized time in a further improved manner, in addition to the replication of IEEE 1588 grand masters the HAGM implements a fault-tolerant clock synchronization method. This fault-tolerant clock synchronization method uses the messages from the redundant IEEE 1588 grand master nodes as input and generates new IEEE 1588 messages. In particular, as discussed above, the HAGM generates IEEE 1588 Announce messages that indicate the HAGM as the best grand master in the system, and in one realization the information for the IEEE 1588 Announce messages can be statically configured at design time of the computer system. The IEEE 1588 Sync messages of the HAGM represent a consolidated view of the current local clock times of the redundant IEEE 1588 grand masters of the multitude of nodes forming the HAGM. The fault-tolerant clock synchronization method is used to establish such a consolidated view of the times of the local clocks. Well-known fault-tolerant clock synchronization methods that are used in industry are for example the fault-tolerant average used in the TTP protocol or the TTEthernet compression function.

In one particularly advantageous realization of the invention, the HAGM may be implemented in a TTEthernet network; in this case the TTEthernet compression function may be used as fault-tolerant clock synchronization method of choice. In other words the subsystem according to the invention may be realized as a TTEthernet system configured to realize the high-availability grand master clock, where the TTEthernet system consists of one network interface card or a multitude of network interface cards and one switch or a multitude of switches, and each network interface card is connected to at least one switch by bi-directional communication links. This TTEthernet system may itself implement IEEE 1588 grand master clocks.

The network according to this realization of the invention may further be connectable to at least two redundant standard IEEE 1588 grand master clock, wherein said TTEthernet system is configured to generate IEEE 1588 Sync messages as a response to receiving IEEE 1588 Sync messages from redundant standard IEEE 1588 grand master clocks, wherein a) all non-faulty redundant standard IEEE 1588 grand master clocks generate their the IEEE 1588 Sync messages at the same points in time according their local perception of time, and b) the TTEthernet compression function is used to collect the IEEE 1588 Sync messages from redundant standard IEEE 1588 grand master clocks and to generate the new IEEE 1588 Sync message.

In this case, the TTEthernet compression function could be implemented in the TTEthernet switches. Alternatively or in addition, a multitude of TTEthernet compression functions could be implemented in the TTEthernet system. In a useful further development of this case all redundant standard IEEE 1588 grand master clocks may be configured to send their IEEE 1588 Sync messages to all TTEthernet compression functions, wherein each compression function generates a new IEEE 1588 Sync messages.

In an further aspect of the invention, a standard IEEE 1588 master clock or standard IEEE 1588 slave clock is configured to receive redundant IEEE 1588 Sync messages as produced by the high-availability grand master clock, whereby the IEEE 1588 master clock or IEEE 1588 slave clock uses timing information carried by the redundant IEEE 1588 Sync messages from the high-availability grand master clock to correct its local clock. The timing information can, for instance, be one of the following types: the mean, the median, the fault-tolerant mean, or the fault-tolerant median of the timing information.

BRIEF DESCRIPTION OF THE DRAWINGS

In the following, further details, suitable developments and advantages of the present invention will become clear from the exemplary embodiments illustrated in the drawings, which show.

DETAILED DESCRIPTION OF THE INVENTION

The following exemplary embodiments describe a few of the possible realizations of the invention. The figures show exemplary solutions corresponding to specific embodiments of a network subsystem according to the invention; the subsystem may be part of a larger network (not shown) which preferably is a TTEthernet system. Of course the invention is not restricted to the embodiments shown here, which are not to be construed as limiting the scope of the invention to only the embodiments shown and/or discussed; rather, the person skilled in the art will readily devise further modifications and implementations within the scope of the appended claims. All solutions and aspects presented here are of exemplary character and can be combined freely with each other.

Figure 1:
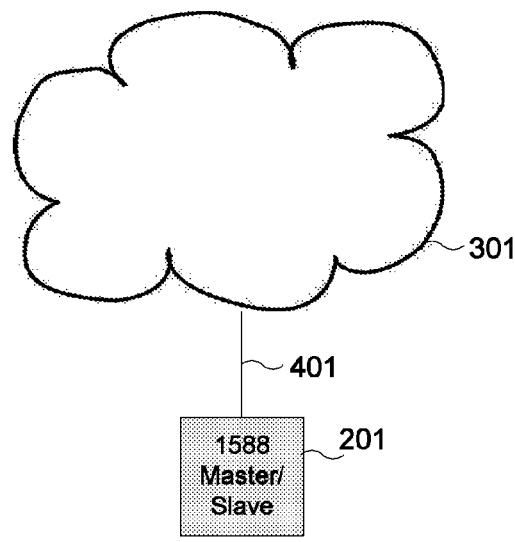
FIG. 1 illustrates a HAGM connected to an IEEE 1588 Master/Slave.
Figure 2:
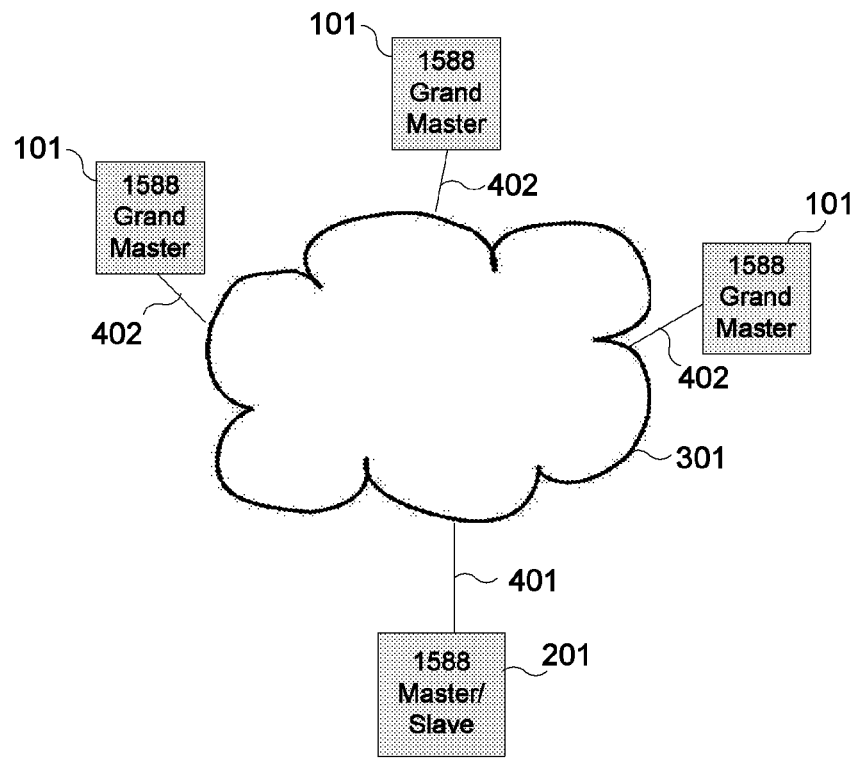
FIG. 2 illustrates a HAGM which uses the time information of three redundant external IEEE 1588 grand master clocks to synchronize an IEEE 1588 Master/Slave.

FIG. 1 depicts a HAGM 301 which sends IEEE 1588 synchronization messages over the physical connections 401 to an IEEE 1588 Master/Slave 201. FIG. 2 depicts a variant network layout wherein a HAGM 301 uses the time information of redundant IEEE 1588 grand master clocks 101 transmitted over the physical connections 402 to produce IEEE 1588 synchronization messages which it sends to an IEEE 1588 Master/Slave over the physical connection 401. According to the invention a) the high-availability grand master clock (301) consists of a multitude of physical devices, as explained further below, b) the high-availability grand master clock (301) can tolerate the failure of one or many of the devices of the multitude of devices, and c) IEEE 1588 Master clocks (201) and/or IEEE 1588 Slave clocks (201) are physically connected to the high-availability grand master clock (301) via one or a multitude of bi-directional communication links (401).

The HAGM 301 of FIGS. 1 and 2 forms a grand master clock according to the IEEE 1588 Standard and is realized by a subsystem according to the invention which can comprise part of or all of the components of the network. A network node (or simply node) which participates in forming this subsystem may be, for instance, a computer, network interface card (NIC), Ethernet switch, microprocessor with integrated Ethernet controller or the like.

Figure 3:
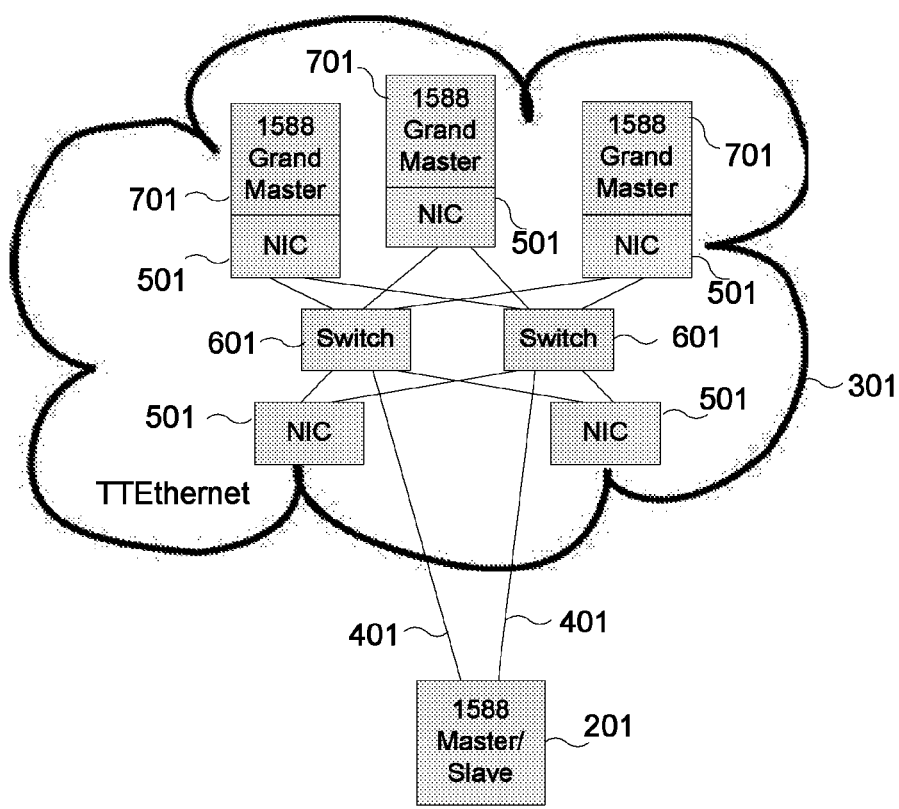
FIG. 3 illustrates a realization of a HAGM in form of a TTEthernet network consisting of end systems and switches, where some of the TTEthernet end systems implement IEEE 1588 grand master clocks.

FIG. 3 depicts a realization of a HAGM 301 in form of a TTEthernet network consisting of end systems and Switches 601, where all of the end systems are equipped with TTEthernet Network Interface Cards (NIC) 501 and some of the end systems implement IEEE 1588 grand master clocks 701. This TTEthernet-based realization of the IEEE 1588 HAGM clock 301 sends IEEE 1588 synchronization messages redundantly via the physical connections 401 to an IEEE 1588 Master/Slave. TTEthernet NICs 501 and switches 601 implement transparent clocks using free-running local clocks as known from prior art. The functionality of the TTEthernet transparent clock is similar to the IEEE 1588 end-to-end and peer-to-peer transparent clock functionality. For protocol control frames (PCFs) and for a configurable set of other frames TTEthernet switches measure the frame's latency. This delay plus a configurable value is then written in a dedicated field of the frame. The configurable value is intended to compensate for the wire delays and is, thus, a cheaper (though less flexible) alternative to the peer-to-peer transparent clock.

The subsystem shown in FIG. 3 illustrates an example of a compatibility mode which not only allows to synchronize an IEEE 1588 timeline to TTEthernet, but also shows how to leverage native TTEthernet mechanisms in such a way that TTEthernet can simulate a fail-operational IEEE 1588 grand master clock. For this, the three NICs 501 implement three 1588 grand master clocks 701. These clocks 701 are configured to periodically provide their synchronization messages at the same point in time according to their local clock, which allows to extend the compression master (CM) functionality in the switches 601 in such a way that they consume these original synchronization messages and produce a new IEEE 1588 synchronization message at a point in time that reflects the average (or median) of the grand master clocks 701. In the case that a grand master clock should fail, the failure is masked by the CM: the absence of a grand master clock or faulty value is compensated by the averaging (or median) function, provided that a sufficiently high number of grand master clocks is present. The failure of the CM itself can be mitigated by having the grand master clocks 701 send their synchronization messages to both CMs (which are realized in the switches 601), which in turn generate identical IEEE 1588 synchronization messages and forward them to the legacy IEEE 1588 equipment, indicated by the communication paths 401. This legacy component then may pick either one of them or execute an average calculation on these synchronization messages itself. This will resulting in differing fault-tolerance properties within the scope of the invention.

A configuration of the kind as shown has use cases in which IEEE 1588 devices need to be synchronized in a fault-tolerant way, for example, because these devices are part of a safety-critical system themselves.

The configuration of the subsystem 301 ensures that the IEEE 1588 Announce messages of the HAGM are taken as the best possible Announce messages according to the IEEE 1588 standard. This can be done, e.g., by setting the grandmasterPriority1 (IEEE 1588-2008, p. 88) of the HAGM uniquely to the best priority possible in the network. As a consequence the PTP protocol will select the HAGM as the best clock using the data set comparison algorithm (IEEE 1588-2008, p. 89, FIG. 27). Alternatively, other configurations are possible that ensure that the IEEE 1588 announce messages of the HAGM are selected as the best master messages using the decision algorithm as specified in IEEE 1588. Given the configurations of the nodes in the network, it is straightforward to determine the configuration of the HAGM to be selected as the best master by comparing the configurations of the nodes in the system with the data set comparison algorithm.

Figure 4:
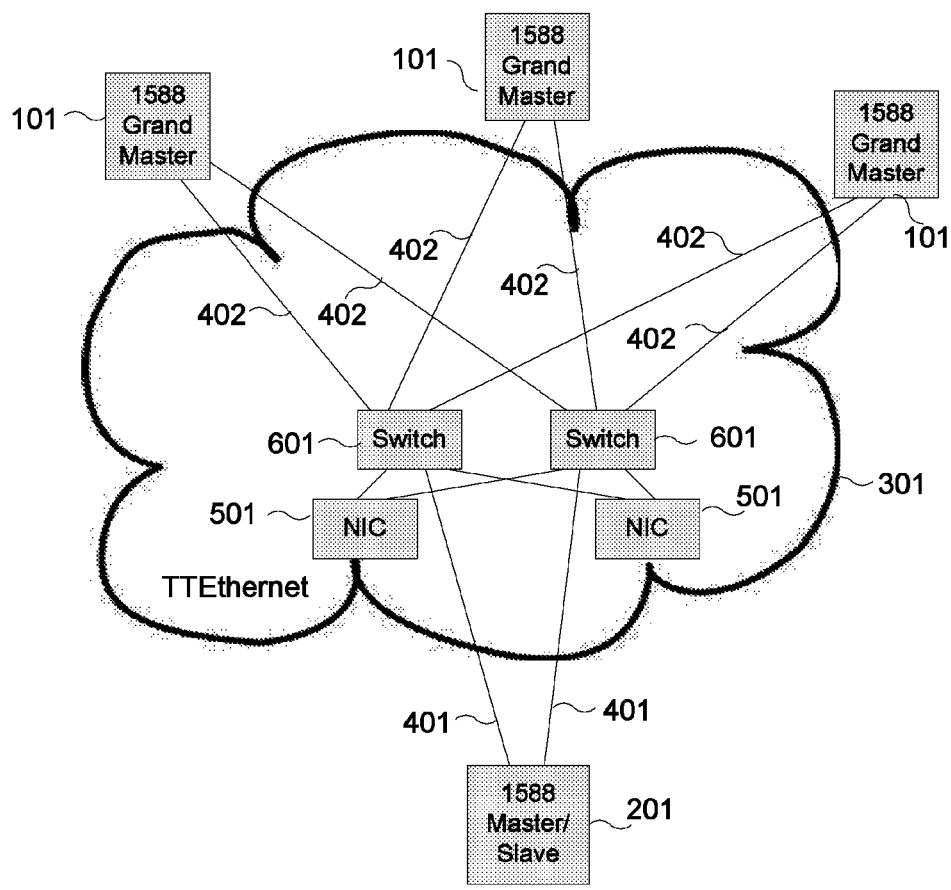
FIG. 4 illustrates a realization of a HAGM in form of a TTEthernet network consisting of end systems and switches, where the TTEthernet switches generate fault-tolerant IEEE 1588 synchronization messages in response from the input they receive from three external IEEE 1588 grand master clocks.

FIG. 4 depicts another realization of a HAGM 301 in form of a TTEthernet network, which uses the synchronization messages of external IEEE 1588 grand master clocks 101 as input delivered via the physical connections 402 to the switches 601. The switches 601 consolidate the IEEE 1588 synchronization messages from the external IEEE 1588 grand master clocks and send new IEEE 1588 synchronization messages to other IEEE 1588 Master/Slave components 201 via the physical connections 401.

FIG. 4 illustrates another compatibility mode between IEEE 1588 and TTEthernet. This embodiment directly implements functionality in the TTEthernet switches such that the switches identify IEEE 1588 traffic, measure its delay and set the correction values in the appropriate field. This realizes a communication from the external IEEE 1588 grand master clocks 101 via selected links 402 to a switch 601 and further via a link 401 to the device 201.

In another variant (not shown), an external IEEE 1588 grand master clocks 101 may be connected to an TTEthernet NIC 501. IEEE 1588 synchronization messages are tunneled using functionality in the TTEthernet NICs. For this, the NIC 501 would translate the IEEE 1588 frames such that they are recognized by the TTEthernet switches 601.

One use case for such a configuration would be a test setup for the TTEthernet system itself; the IEEE 1588 synchronized timeline could be used to measure whether the TTEthernet algorithms are implemented correctly, e.g., if PCFs are dispatched temporally correctly.

The following requirements, for instance, may suitably serve to achieve single fault-tolerance in a TTEthernet network:

Each sending node transmitting messages fault-tolerantly to one or more receiving nodes is connected to the receiving nodes via at least two node-independent paths through the network also known as channels. While channels are node-independent of each other, sending and receiving nodes share the two (or more) channels.

This generic requirement is independent of clock synchronization.

In order to participate in clock synchronization,
each node will be required implement the Sync Client function
at least four nodes will be required implement the Sync Master function
on each of the two paths at least one node will be required implement the Compression Master function
as defined in the TTEthernet specification. Such a network is said to implement the TTEthernet protocol in a single-fault tolerant configuration.

TTEthernet also supports a dual-fault-tolerant configuration using a third channel with at least 7 nodes implementing the Sync Master function.

The invention claimed is:

1. A network comprising a plurality of nodes and a plurality of connections where each connection connects at least two nodes to allow communication between connected nodes including an exchange of messages according to a network protocol comprising:
a high-availability grand master clock according to the IEEE 1588 Standard that is implemented by a subsystem of the network of at least two computing nodes that includes a switch and is configured to tolerate failure of at least one of at least two nodes in the subsystem, where the high-availability grand master clock provides a compression function that configures the subsystem to:
receive IEEE Sync messages from a plurality of standard IEEE 1588 grand master clocks connected to the subsystem implementing the high-availability grandmaster clock,
generate a new IEEE 1588 Sync message based upon the IEEE 1588 Sync messages received from the plurality of standard IEEE 1588 grandmaster clocks, and
transmit the new IEEE Sync message over at least one bi-directional communication link to at least one of an IEEE 1588 Master clock and IEEE 1588 Slave clock, where each at least one bi-directional communication link physically connects one of an IEEE 1588 Master clock and an IEEE 1588 Slave clock to the subsystem implementing the high-availability grand master clock.

2. The network according to claim 1, characterized in that the high-availability grand master clock is configured to generate and send IEEE 1588 Announce messages that guarantee that the high-availability grand master clock is selected as the best master by an IEEE 1588 best master clock algorithm.

3. The network according to claim 2, characterized in that the high-availability grand master clock is configured to not forward at least one of IEEE 1588 Sync messages and the IEEE 1588 Announce messages to the the plurality of standard IEEE 1588 grand master clocks.

4. The network according to claim 1,
wherein the high-availability grand master clock consumes the IEEE 1588 Sync messages and IEEE 1588 Announce messages from the plurality of standard IEEE 1588 grand master clocks and does not forward the received IEEE 1588 Sync messages, and
timing information represented by the IEEE 1588 Sync messages generated by the high-availability grand master clock represents at least one of a mean, a median, a fault-tolerant mean, and a fault-tolerant median value of the timing information of the IEEE 1588 Sync messages received from the plurality of standard IEEE 1588 grand master clocks.

5. The network according to claim 4 wherein the representation of at least one of a mean, a median, a fault-tolerant mean, and a fault-tolerant median value of the timing information of the IEEE 1588 Sync messages received from standard IEEE 1588 grand master clocks by the new IEEE 1588 Sync messages generated by the high-availability grand master clock is an offset value.

6. The network according to claim 1, characterized in that the subsystem is realized as a TTEthernet system configured to realize the high-availability grand master clock, where the TTEthernet system includes at least one network interface card and at least one switch and wherein each of the at least one network interface cards is connected to at least one switch by a bi-directional communication link.

7. The network according to claim 6, in which the TTEthernet system implements at least one IEEE 1588 grand master clock.

8. The network according to claim 6, where the network is connected to a plurality standard IEEE 1588 grand master clocks, wherein the TTEthernet system is configured to generate an IEEE 1588 Sync message as a response to receiving an IEEE 1588 Sync message from one of the plurality of standard IEEE 1588 grand master clocks , wherein
each non-faulty one of the plurality of standard IEEE 1588 grand master clock generates an IEEE 1588 Sync message at the same point in time according a local perception of time of each non-faulty redundant standard IEEE 1588 grand master clock , and
wherein the compression function of the high-availability grand master clock is a TTEthernet compression function that is used to collect the IEEE 1588 Sync messages from each of the plurality of standard IEEE 1588 grand master clocks clock and to generate a new IEEE 1588 Sync message.

9. The network according to claim 8, in which the TTEthernet compression function is implemented in the at least one switch.

10. The network according to claim 8, wherein a plurality of TTEthernet compression functions is implemented in the at least one switch.

11. The network according to claim 10, the plurality of standard IEEE 1588 grand master clocks are configured to send IEEE 1588 Sync messages to each of the plurality of TTEthernet compression functions and each of the plurality of TTEthernet compression functions generates new IEEE 1588 Sync messages.

12. The network according to claim 1 wherein one of a standard IEEE 1588 master clock and a standard IEEE 1588 slave clock is configured to receive redundant IEEE 1588 Sync messages as produced by the high-availability grand master clock, whereby the one of the IEEE 1588 master clock and the IEEE 1588 slave clock uses at least one of a mean, a median, a fault-tolerant mean, a fault-tolerant median of the timing information carried by the redundant IEEE 1588 Sync messages from the high-availability grand master clock to correct a local clock.

13. A method for implementing a network comprising:
providing a plurality of computing nodes forming a subsystem; implementing a high-availability grand master clock according to the IEEE 1588 Standard using the subsystem; that tolerates a failure of at least one of the plurality of nodes forming the subsystem by providing a compression function configured to:
  receive IEEE Sync messages from a plurality of standard IEEE 1588 grand master clocks connected to the subsystem implementing the high-availability grandmaster clock,
  generate a new IEEE 1588 Sync message based upon the IEEE 1588 Sync messages received from the plurality of standard IEEE 1588 grandmaster clocks, and
  transmit the new IEEE Sync message over at least one bi-directional communication link to at least one of an IEEE 1588 Master clock and IEEE 1588 Slave clock, where bi-directional link physically connects at least two IEEE clocks that are each one of an IEEE 1588 Master clock and IEEE 1588 Slave clock to the subsystem implementing a high-availability grand master clock.

14. A TTEthernet (Time-Triggered Ethernet) switch configured in a subsystem of a plurality of nodes in a network that provides an IEEE 1588 high-availability grand master clock, the TTEthernet switch comprising: a network interface card; at least one switch wherein each of the at least network interface cards is connected to at least one switch by a bi-directional communication link; and where the network is connected to a plurality of standard IEEE 1588 grand master clocks, wherein the TTEthernet switch is configured to receive IEEE Sync messages from the plurality of standard IEEE 1588 grand master clocks connected to the subsystem implementing the high availability grandmaster clock, generate a new IEEE 1588 Sync message based on the IEEE 1588 Sync messages from the plurality of standard IEEE 1588 grand master clocks, and transmit the new IEEE Sync message over at least one bi-directional communication link to at least one of an IEEE 1588 Master clock and IEEE 1588 Slave clock, where bi-directional link physically connects the one of an IEEE 1588 Master clock and IEEE 1588 Slave clock to the subsystem implementing a high-availability grand master clock and wherein each non-faulty one of the plurality of standard IEEE 1588 grand master clocks generates an IEEE 1588 Sync message at the same point in time according a local perception of time of each non-faulty one of the plurality of standard IEEE 1588 grand master clocks and a TTEthernet compression function is used to collect the IEEE 1588 Sync messages from each redundant standard IEEE 1588 grand master clock and to generate a the new IEEE 1588 Sync message.

* * * * *